Feb. 13, 1934.     M. J. TRUE     1,946,772
EGG FILTERING APPARATUS
Filed July 7, 1933
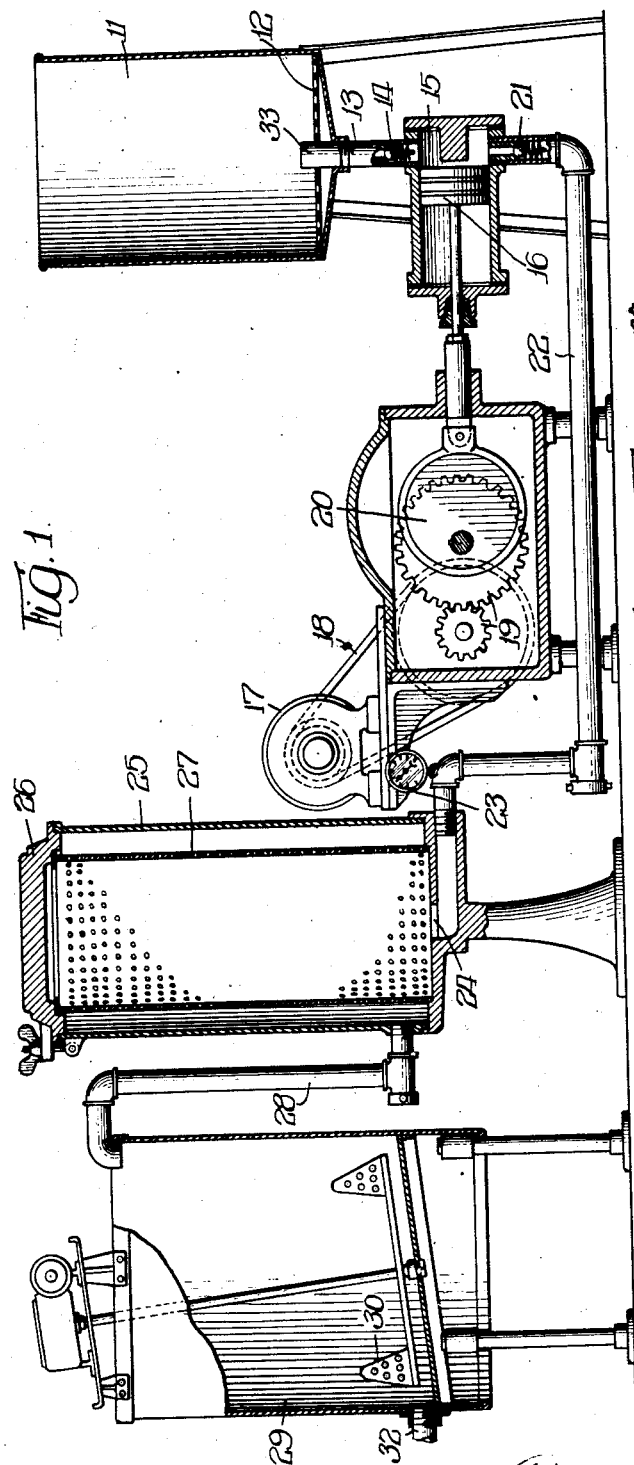
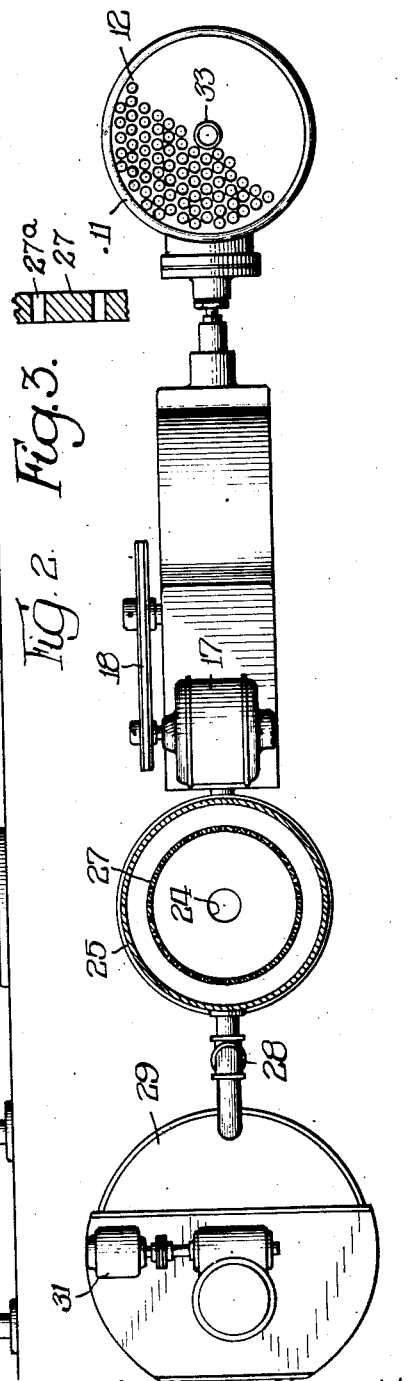
Inventor
Melville J. True,
By Cromwell, Greist & Warden
Attys Patented Feb. 13, 1934

1,946,772

UNITED STATES PATENT OFFICE 1,946,772

EGG FILTERING APPARATUS

Melville J. True, Chicago, Ill., assignor to Armour and Company, Chicago, Ill., a corporation of Illinois Application July 7, 1933. Serial No. 679,307

7 Claims. (Cl. 210—154)

My invention pertains to the production of "frozen eggs" for use by the bakery and confectionery trade. This product consists of fresh perfect eggs broken, thoroughly commingled to insure uniformity of color throughout, and frozen solid for shipment and preservation against deterioration until required for use.

This frozen egg commodity is very largely used by the trade, being more economical than whole eggs, not subject to aging and of uniform quality and color.

To produce this commodity efforts are constantly being made to improve mechanical means for freeing the egg content from bits of shell, from chalazæ or fibrous matter, such as the yolk sac, and for thoroughly commingling to secure uniformity of color and absence of streaks, all without undue agitation or subjection to high pressure, both of which have a deleterious effect upon the leavening properties of the egg product.

It has been proposed to force the egg material by means of a centrifugal or so-called "Viking" pump through a churn, and even to incorporate in the pipe a cylindrical mesh strainer of small diameter and surface area to remove the fibrous content and shell; but heretofore the screen, being but slightly larger in diameter than the pipe and being of wire mesh, has interposed such resistance by reason of clogging of the mesh due to entangling of the chalazæ that injurious very high pressures, in the neighborhood of 80 lbs., are required to force the eggs through the screen, accompanied by disadvantageous churning of the eggs by the high speed pump; and even so the screen must be removed and cleaned of the accumulated fibrous matter two or three times each hour.

The primary objects attained by my invention are the avoidance of churning of the eggs in the pump by the use of a slow speed valve piston pump; and maintenance of a low pressure of 20 lbs. to 25 lbs. by the employment of a filter cylinder of relatively large diameter and total surface area; the avoidance of built-up back pressure and consequent churning of the eggs and frequent cleaning of the filter by the use of a large-area foraminous metal cylinder, preferably Monel metal or stainless steel, having apertures of from $\frac{1}{32}''$ to $\frac{1}{8}''$ in diameter with cutting edges, as distinguished from the rounded edges of wire, whereby the yolk sacs and other fibrous matter do not become tangled as with a wire mesh but are cut and allowed to pass through in unobjectionable small particles.

By such employment of a slow speed reciprocating pump and a filter cylinder of foraminous metal and of large area, I am enabled to reduce greatly the cleaning intervals, to do away with objectionable churning of the eggs by the pump and the high pressures which act injuriously upon the egg material. The resultant product is much superior to that heretofore obtainable and is produced much more expeditiously and with consequent saving in cost.

In order that the invention may be readily understood I have set forth in the accompanying drawing and in the detailed description predicated thereon one embodiment of the invention, by way of illustration only.

In the drawing,

Fig. 1 is a vertical longitudinal section through the various units of the assemblage;

Fig. 2 is a top plan view, and

Fig. 3 is an enlarged fragmentary section through the apertures of the filter element.

The eggs, broken, are projected from the shell either directly or indirectly into the reception vessel 11 which may or may not be equipped with a comparatively large mesh screen or perforated plate 12 for catching any large portions of shell which may accidentally be dropped into the vessel. This reception vessel discharges through the pipe 13 past the check valve 14 into the pump cylinder space 15 in advance of the piston 16 reciprocated in any approved manner, here shown as including the motor 17, belt 18, gearing 19, and eccentric 20.

As the piston 16 moves to the left the inlet check valve 14 is retracted and the egg material drawn from the vessel 11 into the space 15, the suction created holding the outlet check valve 21 seated. As the piston 16 moves to the right the inlet valve 14 is seated and the outlet valve 21 is unseated and the egg material caused to flow therethrough by way of the pipe 22, provided with a pressure gauge 23, to the port 24 at the bottom of the filter cylinder 25, which latter is sealed by a releasable cover 26. Concentrically disposed within the cylinder 25 and about the port 24 is a filter screen 27 comprising a foraminous cylinder of sheet metal, preferably stainless steel or other non-corrodible metal, provided throughout its surface area with apertures of small diameter, say $\frac{1}{32}''$ to $\frac{1}{8}''$, the side walls of these apertures forming with the inner surface a sharp angle as at 27a in Fig. 3 whereby fibrous egg material presented thereto under moderate pressure will be cut into small fragments and allowed to pass.

The egg material entering the interior of the filter screen 25 and passing through the small apertures to the space between the filter screen and the cylinder walls will be discharged through the pipe 28 into a mixing vessel 29, wherein by means of the revolving blades 30 driven by the motor 31 the egg material will be so thoroughly commingled as to safeguard against any possibility of differently colored eggs retaining their individuality, which would result in streaks. Thereupon the material is discharged at 32 ready for freezing and packaging.

It will be observed that the filtering area of the foraminous cylinder 27 is very great relative to the capacity of the pipe 22 so that for that reason alone the clogging of the filter would be minimized and the interval of available use before celaning greatly lengthened. Moreover, the filter being made of foraminous sheet metal with the perforations having cutting edges, unobjectionable material such as egg fibre will in a large measure be permitted to pass through after being cut into small particles, whereas the matter caught by the filter will consist of bits of shell and any other foreign matter which may have gotten into the receptacle 11 and beyond the screen 12. If the filter screen be of wire mesh as has hitherto been the practice, the egg fibres instead of being cut and passing through the filter become entangled with the woven mesh and speedily clog the same.

It will further be observed that by the employment of a slow speed reciprocating pump with simple inlet and outlet valves there is no such churning of the egg material as would result from the use of a centrifugal or pump of the Viking type.

Built-up pressure in the pipe line and pump due to clogging of the filter is not only of itself injurious to the egg material but increases the churning action of the pump, as will be obvious. These disadvantages are avoided by the use of a filter screen which has little tendency to clog and by the employment of a reciprocatory type slow speed pump which cannot have any churning action upon the egg material. Moreover, the employment of this sort of filter of large area permits continuous operation over a period of hours rather than minutes between cleaning operations whereby production is increased and cost minimized.

The coarse screen 12 in the reception vessel, for catching bits of egg shell or other foreign matter accidentally falling into the reception vessel, may be supplemented or substituted by a removable inlet pipe section 33, loosely seated within the discharge outlet and upstanding three of four inches above the bottom, thus forming a catch-all about said pipe section for gravitational separation. In many cases both the coarse screen 13 and the pipe section 33 may be omitted.

I claim:

1. Egg filtering apparatus comprising in tandem intercommunicating arrangement a reception vessel, a reciprocatory pump, a cylinder of large capacity having therein a large-area filter cylinder of foraminous metal with sharp edged apertures, a stirring vessel, and a discharge outlet.

2. Egg filtering apparatus comprising in tandem intercommunicating arrangement a reception vessel, a slow speed reciprocatory pump, a cylinder of large capacity having therein a large-area filter cylinder of foraminous non-corrodible metal with apertures of from $\frac{1}{32}''$ to $\frac{1}{8}''$ diameter, a stirring vessel with driven blades, and a discharge outlet.

3. Egg filtering apparatus comprising in tandem intercommunicating arrangement a reception vessel, a slow speed reciprocatory pump with valved inlet and outlet, a cylinder of large capacity having therein a concentrically arranged large area filter cylinder of foraminous non-corrodible metal with sharp edged apertures, a stirring vessel, a discharge outlet, and a pressure gauge interposed between the pump and filter.

4. Egg filtering apparatus comprising in tandem intercommunicating arrangement a reception vessel provided with a coarse screen, a slow speed reciprocatory pump with valved inlet and outlet, a cylinder of large capacity having therein a concentrically arranged large-area filter cylinder of foraminous Monel metal with sharp edged apertures of from $\frac{1}{32}''$ to $\frac{1}{8}''$ diameter, a stirring vessel with driven blades, a discharge outlet, and a pressure gauge interposed between the pump and filter.

5. Egg filtering apparatus comprising in tandem intercommunicating arrangement a reception vessel with a discharge outlet above the bottom thereof to provide a catch-all below said outlet, a reciprocatory pump, a cylinder of large capacity having therein a large-area filter cylinder of foraminous metal with sharp edged apertures, a stirring vessel, and a discharge outlet.

6. Egg filtering apparatus comprising in tandem intercommunicating arrangement a reception vessel having a discharge pipe with a removable inlet section upstanding from the bottom of the vessel to provide a catch-all, a reciprocatory pump, a cylinder of large capacity having therein a large-area filter cylinder of foraminous metal with sharp edged apertures, a stirring vessel, and a discharge outlet.

7. The method of filtering eggs at low pressure and without churning, with comprises forcing the material at a pressure of less than forty pounds by reciprocatory means through a large-area filter of foraminous metal and thereby cutting and passing the fibrous content in small particles while excluding shell and other solid matter, and thereafter thoroughly stirring to eliminate color streaks.

MELVILLE J. TRUE.